US007913491B2

(12) United States Patent
Lin et al.

(10) Patent No.: US 7,913,491 B2
(45) Date of Patent: Mar. 29, 2011

(54) HYDRAULIC FLOW CONTROL SYSTEM AND METHOD

(75) Inventors: Hong-Chin Lin, Glenview, IL (US); James Eugene Schimpf, Plainfield, IL (US); James Thomas Ferrier, Elgin, IL (US)

(73) Assignee: Caterpillar Inc., Peoria, IL (US)

( * ) Notice: Subject to any disclaimer, the term of this patent is extended or adjusted under 35 U.S.C. 154(b) by 369 days.

(21) Appl. No.: 11/987,526

(22) Filed: Nov. 30, 2007

(65) Prior Publication Data

US 2009/0142201 A1 Jun. 4, 2009

(51) Int. Cl.
*F16D 31/02* (2006.01)
*F15B 13/04* (2006.01)

(52) U.S. Cl. .......................................... 60/468; 91/436

(58) Field of Classification Search ................ 91/1, 436, 91/437, 440; 60/468
See application file for complete search history.

(56) References Cited

U.S. PATENT DOCUMENTS

| | | | |
|---|---|---|---|
| 3,267,966 | A | 8/1966 | Williams |
| 3,434,392 | A | 3/1969 | Landers |
| 3,824,896 | A | 7/1974 | Tull, III |
| 4,194,436 | A | 3/1980 | Imada |
| 4,955,282 | A | 9/1990 | Ranson |
| 5,370,038 | A | 12/1994 | Poppe et al. |
| 5,415,076 | A | 5/1995 | Krone et al. |
| 5,669,282 | A | 9/1997 | Tanino et al. |
| 5,791,226 | A | 8/1998 | Chung et al. |
| 5,862,831 | A | 1/1999 | Chung et al. |
| 5,996,465 | A | 12/1999 | Morikawa et al. |
| 6,173,639 | B1 | 1/2001 | A'Hearn et al. |
| 6,267,041 | B1 | 7/2001 | Skiba et al. |
| 6,955,115 | B1 | 10/2005 | A'Hearn et al. |
| 2007/0151442 | A1 | 7/2007 | Kraft |
| 2008/0072749 | A1 * | 3/2008 | Pfaff et al. ..................... 91/436 |

* cited by examiner

*Primary Examiner* — Michael Leslie
(74) *Attorney, Agent, or Firm* — Finnegan, Henderson, Farabow, Garrett & Dunner LLP

(57) ABSTRACT

Apparatus and methods are provided for controlling a double-acting hydraulic cylinder during a load-induced rod-extending operation. The apparatus includes a activation circuit and valve for providing a flow path from a pump to the cylinder head end; a flow regeneration circuit and valve fluidly connecting the cylinder rod end and the cylinder head end and configured for providing flow from the rod end to the head end during rod extension; and a controller responsive to rod-extending rate demands and rod-position sensor signals, and operatively connected to the regeneration flow valve and the activation valve. The activation valve also includes a return valve part to control flow from the rod end to the fluid reservoir during rod extension. Both the activation valve and the return valve part are controllable by the controller independently from the regeneration flow valve.

18 Claims, 4 Drawing Sheets

HYDRAULIC FLOW CONTROL SYSTEM AND METHOD

TECHNICAL FIELD

This invention relates to the control of double-acting hydraulic cylinders e.g. in earth-moving equipment. In particular, this invention relates to use of flow regeneration to control double-acting cylinders in load-lowering and other operations where the cylinder rod extends under the influence of a load during the operation.

BACKGROUND

Use of flow regeneration circuits in controlling double-acting cylinders, including cylinders with a main directional control valve, is known. U.S. Pat. No. 6,267,041 (Skiba et al.) discloses a fluid regeneration circuit for a hydraulic cylinder having a directional control valve, wherein the regeneration flow path includes a separate regeneration valve between the rod end and head end. The regeneration valve is under the control of a controller and directs flow from the rod end to either the head end or to the system tank during certain rod extending operations. However, such systems cannot accommodate certain operations where flow from the rod end to both the head end and to the tank are desired, or where regenerative flow to the head end is required at relatively low rod extension speeds, such as controlled load-lowering e.g. in a wheel loader. Rather, the circuit disclosed in the Skiba et al patent provides regeneration flow only for rod speeds and/or rod extension demands greater than a preselected threshold.

The present disclosure thus seeks to improve upon existing cylinder control apparatus and methods to mitigate one or more of these shortfalls.

SUMMARY OF THE DISCLOSURE

In one aspect of the disclosure, apparatus is disclosed for controlling a double-acting hydraulic cylinder during a load-induced rod-extending operation, the cylinder being activated by fluid supplied from a reservoir by a pump, the cylinder having a rod end, a head end, a piston connected to rod for engaging the load, the cylinder piston being urged toward the rod end by the load during the operation. The apparatus includes a cylinder activating circuit including an activation valve for providing a flow path from the pump to the cylinder head end. The apparatus also includes a flow regeneration circuit fluidly connecting the cylinder rod end and the cylinder head end and configured for providing flow from the cylinder rod end to the cylinder head end during rod extension, the regeneration circuit including a regeneration flow valve. The apparatus further includes a controller operatively connected to the regeneration flow valve and the activation valve, the controller being responsive to rod-extending rate demands from an operator to control the activation valve to provide flow from the pump to the head end and to control the regeneration valve to provide flow from the rod end to the head end. The cylinder activating circuit also includes a return flow path between the cylinder rod end and the fluid reservoir, and a return valve positioned in the return flow path and configured to control flow from the cylinder rod end to the fluid reservoir. Both the return valve and the activation valve are controllable by the controller independently from the regeneration flow valve.

In another aspect of the present disclosure, a method is disclosed for controlling a double-acting hydraulic cylinder during load-induced rod-extending movement, the cylinder being activated by pressurized hydraulic fluid supplied from a reservoir by a pump and an activation circuit including a directional control valve for selectively directing the pressurized fluid to the cylinder head end or the rod end, the activation circuit also including a return flow path from the rod end to the reservoir for fluid displaced from the rod end during rod-extension. The method includes providing a regeneration flow path from the rod end to the head end, and controlling fluid flow to the head end during the load-induced rod-extension. The controlling method element includes independently controlling the fluid flow from the rod end through the regeneration path to the head end and independently controlling the fluid flow from the pump to the head end, and restricting the flow of displaced fluid from the rod end to the reservoir along the return path independently from controlling the flow through the regeneration path.

DETAILED DESCRIPTION

Figure 1:
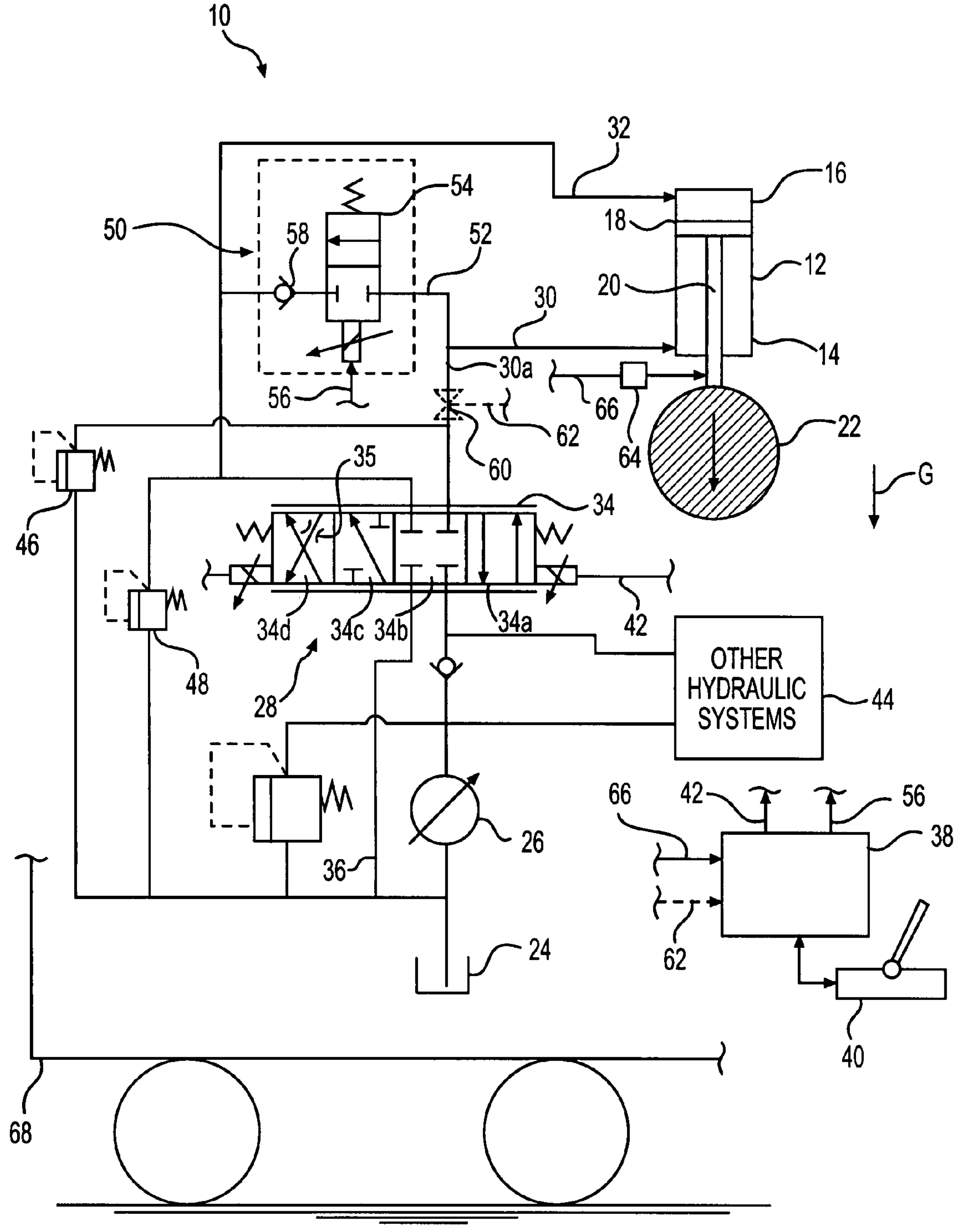
FIG. 1 is a schematic showing apparatus for controlling a double-acting hydraulic cylinder during a load-induced rod-extending operation, specifically a load-lowering operation.

In one aspect of the disclosure, apparatus is disclosed for controlling a double-acting hydraulic cylinder during a load-induced rod-extending operation. The double-acting cylinder is of the type activated by fluid supplied from a reservoir by a pump, the cylinder having a rod end, a head end, and a piston connected to a rod for engaging the load. During the operation, the cylinder piston is urged toward the rod end by the load. With reference to FIG. 1, double-acting cylinder 12, as would be readily understood by one skilled in the art, includes rod end 14, head end 16, and piston 18 connected to rod 20 for engaging/supporting load 22. In some applications, such as the load-lowering operation in FIG. 1, cylinder 12 may be oriented with the rod extension direction in the direction of the force on the load tending to extend the rod, such as the force of gravity designated "G" in FIG. 1. However, the present disclosure also is intended to provide cylinder control in other load-induced rod extension operations such as for other cylinder orientations and for loads due to forces other than gravity.

Also in accordance with the first aspect of the disclosure, the control apparatus may include a cylinder activating circuit including an activation valve for providing a flow path from the pump to the cylinder head end. As depicted in FIG. 1, cylinder 12 is activated by pressurized hydraulic fluid from tank/reservoir 24 and pump 26 via a cylinder activation circuit designated generally by the numeral 28. Circuit 28 includes conduits 30 and 32 operatively connected to allow fluid flow to and from rod end 14 and head end 16, respectively, during a cylinder operation. Conduits 30 and 32 may be protected against pressure overloads such as by pressure relief valves 46 and 48, respectively. One skilled in the art would understand for a cylinder operation requiring rod extension, with piston 18 moving toward rod end 14, a flow out of rod end 14 through conduit 30 would be required. Also during such an operation, a flow into head end 16 through conduit 32 should occur during certain operating conditions in order to prevent the formation of voids in head end 16.

Cylinder activation circuit 28 also may include directional control valve 34 that can provide control over the flow from pump 26 through conduit 32 to cylinder head end 16 during load-lowering or other load-induced rod-extension operation. As depicted in FIG. 1, control valve 34 is a directional control valve for selectively connecting output from pump 26 to conduit 30 or 32, depending on the cylinder piston movement required for the desired operation. As depicted, directional control valve 34 may be spool-activated such that movement of the spool element to the right would complete a flow path from pump 26 through conduit 32 to head end 16, while a leftward movement would complete a flow path from pump 26 through conduit 30 to rod end 14.

Furthermore, as depicted, directional control valve 34 may also be a four-position four-way valve configured to provide a return flow path from cylinder rod end 14 or head end 16 to reservoir 24, such as by conduit 36, again depending upon the required cylinder operation as discussed above. Also as depicted in FIG. 1, directional control valve 34 may be a proportional valve for metering pressurized flow in accordance with a desired cylinder activation rate, such as may be provided by a suitable controller, such as controller 38, using operator input from e.g. joystick 40 or other operator interface equipment. The control connection 42 between controller 38 and the directional control valve may be electrical, hydraulic, or pneumatic, as is convenient.

More specifically, and as shown in FIG. 1, direction control valve 34 is a pilot-controlled four-position, four-way valve. Regarding the four positions, namely positions 34*a*, 34*b*, 34*c*, and 34*d*, from right to left, the 34*b* position is the neutral position, the 34*a* position is for cylinder retraction, and both 34*c* and 34*d* positions are for cylinder rod extension. The 34*c* position does not allow any return flow from rod end 14 to tank (reservoir) 24 along conduit 30 and conduit 36. However, the 34*d* position allows some return flow from rod end 14 to tank (reservoir) 24, but restricts the flow at position 34*d* as represented by orifice designation 35 in FIG. 1, for reasons that will be clear from the subsequent discussion.

As discussed above and depicted in FIG. 1, cylinder 12 may be oriented such that lowering load 22 against the force of gravity will cause extension of rod 20, causing a decrease in the cylinder volume portion at rod end 14 and an increase the cylinder volume portion at head end 16. In some conventional apparatus and systems, all the fluid necessary to fill the expanding head end volume is supplied through the cylinder activation circuit from the fluid reservoir via the pump. In certain situations, however, the capacity of the activation circuit may be unable to supply hydraulic fluid to the cylinder at a rate sufficient to occupy the expanding head end volume for a desired rod extending rate. For example, apparatus configuration and/or operating conditions such as those required to supply hydraulic fluid under pressure to other hydraulic systems serviced by the same pump and reservoir, such as systems 44 depicted in FIG. 1, may put undo constraints on the rates at which the rod can be extended without encountering void formation in the head end of the cylinder.

Still in accordance with the first aspect of the disclosure, the control apparatus includes a flow regeneration circuit fluidly connecting the cylinder rod end and the cylinder head end. The flow regeneration circuit is configured for providing flow from the cylinder rod end to the cylinder head end during rod extension and includes a regeneration flow valve. As depicted in FIG. 1, flow regeneration circuit 50 may include conduit 52 interconnecting conduits 30 and 32 providing the required flow connection between the rod end 14 and head end 16. One skilled in the art would appreciate that one or both ends of conduit 50 alternatively could be connected directly to the rod and head ends to provide the desired regeneration flow path. Regeneration circuit 50 further includes regeneration valve 54, which may be a proportional valve as depicted in FIG. 1 and may be operatively connected to controller 38 via connection 56. Regeneration circuit 50, as depicted, is separately controllable from directional control valve 34 and is configured to provide regeneration flow only from rod end 14 to head end 16, and may include a check valve 58 and/or a regeneration valve 54 specifically configured for one-way flow.

Still further in accordance with a first aspect of the disclosure, the control apparatus may include a controller 38 operatively connected to the activation valve 34 and the regeneration valve 54 to provide, respectively, flow from the pump 26 to the head end 16 and flow from the rod end 14 to the head end 16, during the load-induced rod-extending operation. As disclosed herein and discussed previously, controller 38, which may include a microprocessor, is configured to independently control both directional control valve 34 and regeneration control valve 54 during the load-induced rod-extending operation. Due to the cylinder geometry, specifically the volume occupied by the rod 20 in the cylinder rod end 14, the fluid exiting rod end 14 during a incremental rod extension movement is less than the corresponding volume increase in the cylinder head end 16 such that the regeneration flow through regeneration circuit 50 alone would be unable to supply sufficient flow to the head end 16. Hence, the controller 38 is configured to provide sufficient additional pressurized flow from pump 26 through directional control valve 34, to supply the additional hydraulic fluid to head end 16 to make up the short-fall in the regeneration flow for certain operating conditions to be discussed hereinafter.

Still in accordance with a first aspect of the disclosure, the cylinder activating circuit also includes a return flow path between the cylinder rod end and the fluid reservoir, and a return valve positioned in the return flow path and configured to control flow from the cylinder rod end to the fluid reservoir independently from the control of the regeneration valve. As depicted in FIG. 1 spool-activated directional control valve 34 is configured to provide a return flow path from rod end 14 via conduit 30 to tank/reservoir 24 via conduit 36 but also provide the function of the return valve to totally restrict (i.e. cut-off) return flow in certain valve positions, specifically position 34*c*, or to permit some return flow in other valve positions, such as position 34*d*. Specifically, directional control valve 34 may be configured to restrict return flow from the rod end 14 through the return path during a load-induced rod extending operation, such as the load-lowering operation depicted. That is, directional control valve 34 may be configured to include the function of a return flow valve such that, under the control of controller 38, pump 26 provides pressurized fluid to conduit 32, and thus to cylinder head end 16, during the rod extending operation, but fluid displaced from rod end 14 is totally restricted from traveling back to the fluid reservoir 24 for spool positions corresponding to rate demands less than a predetermined value. The return flow restriction provided by valve 34 may thus providing full regeneration to head end 16 (except for inadvertent leakage) through regeneration circuit 50 for certain situations, such as controlled load-lowering. Moreover, in situations, where only a minimum amount of flow to head end 16 from reservoir 24 via pump 26 through directional control valve 34 and conduit 32 would be required, the present apparatus and methods affording additional flow capacity for operation of other hydraulic systems such as systems 44, due ti the preferential supply from rod end 14 to head end 16 via regeneration circuit 50. Such a flow control configuration would also maximize the allowable rate of rod extension, consistent with the prevention of cavitation and void formation in the head end and related conduits.

Furthermore, directional control valve 34 and controller 38 may be configured to allow some flow via the return path 36 for load lowering rates greater than or equal to the predetermined rod extension rate demand value, thus permitting operation of the cylinder 12 in situations requiring a very high rate of rod extension and necessitating a higher rate of fluid flow out of cylinder rod end 14 than can be accommodated by regeneration circuit 50 alone. Such situations may include a "quick-drop" of load 22, or a lowering of the rod to a standby position, such as ground level, during a shut-down. Other possible situations include rapid rod positioning, and maintenance operations.

In the FIG. 1 depiction, directional control valve 34 is configured to prevent return flow through conduit 36 for a rightward spool movement less than a specific distance from the depicted neutral position, but to allow some return flow from rod end 14 to tank 24 for spool movement a rightward distance greater than or equal to the specified distance, which distance would correspond to the desired predetermined lowering rate, as discussed above.

Figure 3:
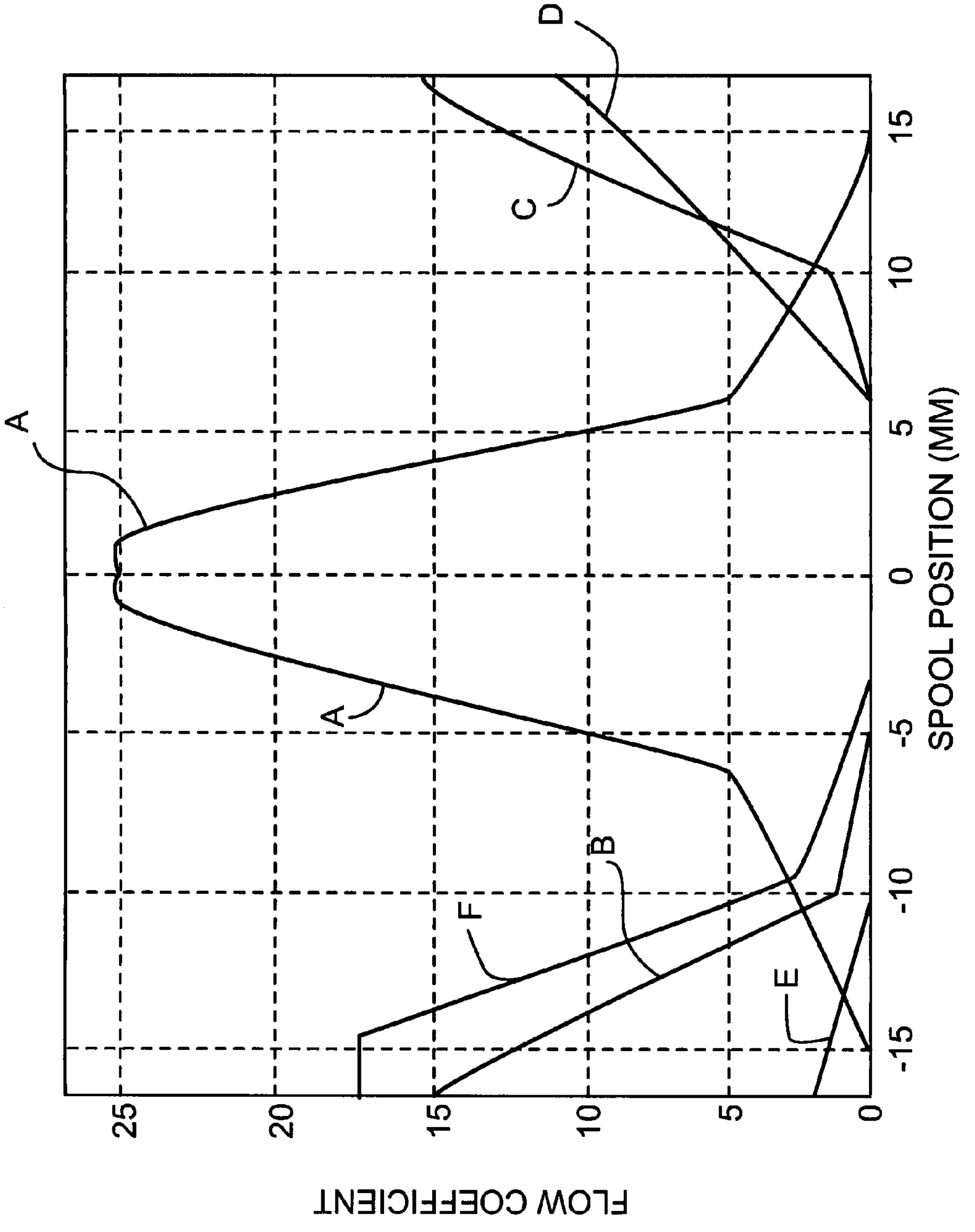
FIG. 3 is a chart showing flow coefficients versus directional control valve position and regeneration valve position, for the apparatus in FIG. 1.

For example, FIG. 3 shows the metering (represented by a flow coefficient) provided by one possible configuration of four-position, four-way direction control valve 34 shown in FIG. 1. The 34*b* neutral position is where the spool displacement is between about −6 mm~ and about +6 mm. At this neutral position, only an internal flow path in valve 34 (not shown) from pump 26 back to tank 24 is open, while the flow paths to head end 16 and rod end 14 via respective conduits 32 and 30 are closed. The internal flow coefficient from pump 26 back to tank 24 depicted as "A" in FIG. 3. The 34*a* position for rod retraction operation is where the spool displacement in directional control valve 34 is between about +6 mm to about +16 mm. At this valve position, the pump 26 flow is directed to rod end 14 through conduit 30 with the flow coefficient depicted as "C" in FIG. 3. The return flow from head end 16 is directed to tank 24 through conduits 32 and 36 and is depicted the applicable flow coefficient is depicted as "D" in FIG. 3.

The 34*c* position In FIG. 1, corresponding to cylinder extension under a load, is where the spool displacement is between about −6 mm to about −11 mm in the FIG. 3 configuration. At this valve position, the pump 26 flow is directed to head end 16 through the flow path conduit 32. The return to-tank flow path from rod end 14 stays closed, at this valve position. Hence, the flow from rod end 14 is not directed to tank 24, but is essentially totally regenerated to head end 16 through regeneration valve 54 as shown in FIG. 3, with a flow coefficient designated by curve "F".

In directional control valve 34 of FIG. 1, the 34*d* position is where the spool displacement is between about −11 mm to about −16 mm. At this valve position, pump 26 flow is directed to head end 16 through the flow path of conduit 32 and the applicable flow coefficient is depicted as "B" in FIG. 3. The return-to-tank flow path from rod end 14, through conduit 30 to directional control valve 34, and then through conduit 36 is, however, partially open as depicted in FIG. 3 as having a flow coefficient "E". The return flow from rod end 14 is therefore "restrictedly" directed to tank 24, while the majority of the flow from rod end 14 is regenerated to head end 16 through regeneration path conduit 52. The regeneration path flow coefficient "F" is shown in FIG. 3 only for illustration, as directional control valve 34 is separate from regeneration valve 54, and regeneration valve 54 and directional control valve 34 are controlled independently. One skilled in the art would be able to readily construct a suitable directional control valve for the above and similar configurations given this disclosure.

Controller 38, which as stated above may include a microprocessor, is configured to control directional control valve 34, which includes a return flow restriction function, and independently control regeneration valve 54, to accommodate the desired rod-extension rate input from joystick 40. The microprocessor memory in controller 38 may have stored relationships ("maps") of joystick position/deflection versus rod extending rate, and/or spool travel versus rod extending rate. One skilled in the art also would be able to provide a controller having the functions and capabilities discussed above and to achieve the methods to be discussed hereinafter, and also to provide the programming logic for the controller to implement those functions, based on the present disclosure.

Still further, control apparatus 10 also may include a sensor 64 operatively connected to controller 38 via connection 66 to provide signals from which can be determined one or more of rod position, rod movement direction, and rate of rod movement (velocity), as one of ordinary skill in the art would appreciate. In this respect, directional control valve 34 may be configured to additionally allow return flow from the rod end 14 directly to tank/reservoir 24 for conditions (not shown) in addition to a rod extension demand rate greater than or equal to the predetermined value, such as for a stationary rod situation or for very small rod extension rates (velocities) less than or equal to a second predetermined value. Again, one skilled in the art would be able to configure directional control valve 34 and controller 38 to accomplish this additional function.

It should also be appreciated by one skilled in the art that various modifications of the disclosed control apparatus may be made consistent with this disclosure. For example, a separate return valve could be used, such as return valve 60 (shown dotted) appropriately positioned such as in portion 30*a* of conduit 30, and under the control of controller 38, such as by independent connection 62. Such a construction would simplify the design of the directional control valve 34, although it would involve a separate, controllable component. Also, although not depicted, a separate conduit could be provided directly interconnecting rod end 14 (or conduit 30) with conduit 36 (or reservoir 24), in which the separate return flow control valve 60 could be positioned if, for example, the directional control valve was not configured to include a rod end return path.

As is evident from the above description, the disclosed control apparatus may be provided as part of a new, integrated machine or vehicle for a load-induced rod-extending operations, such as wheel loader 68 depicted in FIG. 1, or may be provided as control equipment such as in kit form to retro-fit existing equipment already having a double-acting cylinder, reservoir, pump, etc., to the extent such existing components were not incompatible with the above disclosed components and functions or with the following control method aspect of the present disclosure.

INDUSTRIAL APPLICABILITY

In accordance with another aspect of the present invention, methods are disclosed for controlling apparatus having a double-acting hydraulic cylinder during load-induced rod-extending operation, where the cylinder is activated by pressurized hydraulic fluid supplied from a reservoir by a pump, and the cylinder activation circuit includes a control valve for directing pressurized fluid to the cylinder head end during the operation. The apparatus to be controlled by the method to be described hereinafter may also include a return flow path from the rod end to the reservoir for fluid displaced from rod end during rod extension. Such an apparatus has been discussed previously in relation to FIG. 1.

Figure 2:
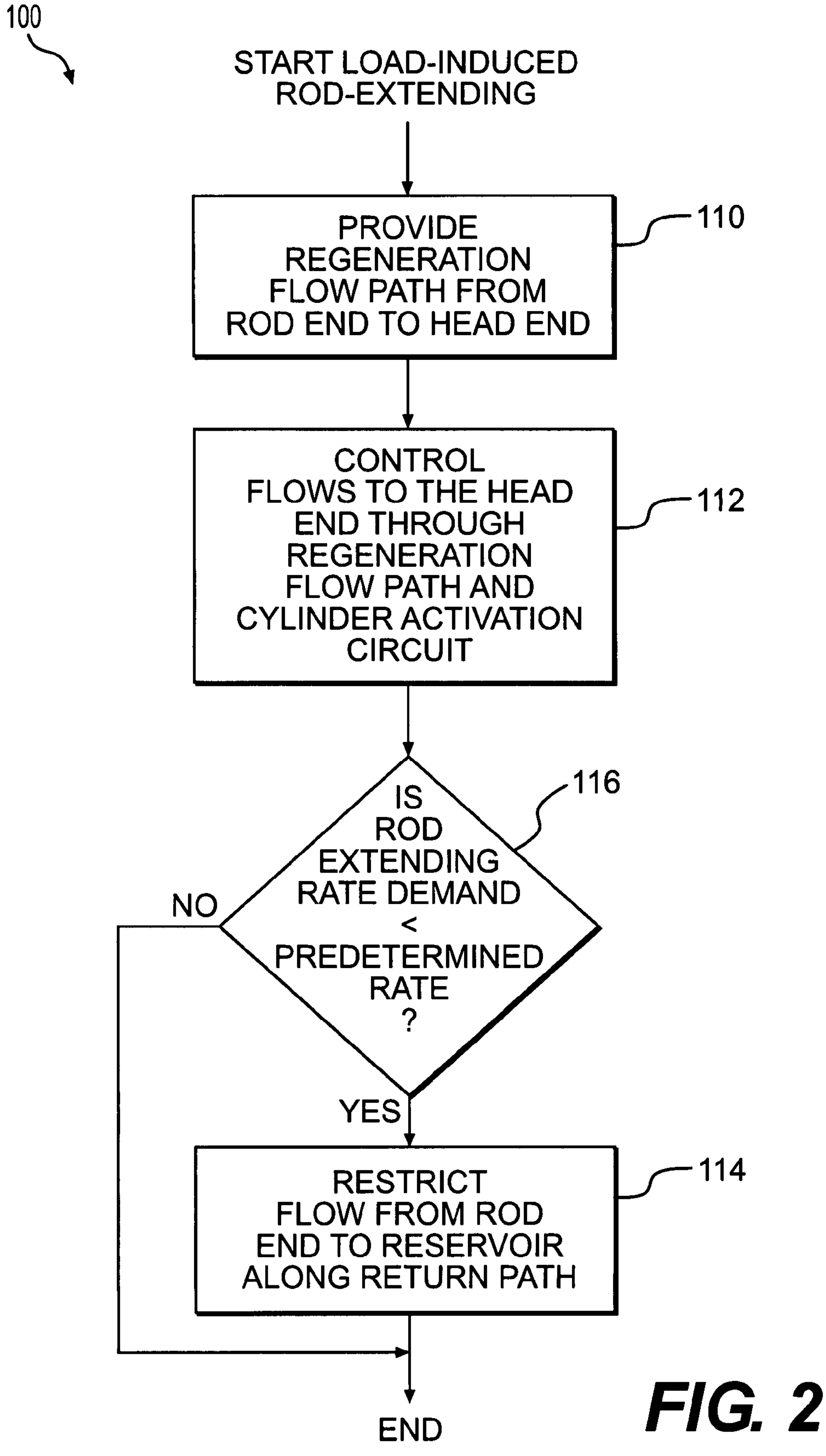
FIG. 2 is a flow chart showing elements of a method for controlling a double-acting hydraulic cylinder during a load-induced rod-extending operation.

Specifically, the method of controlling a double-acting cylinder during load induced rod-extending movement designated generally by the numeral 100 in the flow chart of FIG. 2 includes providing a regeneration flow path from the rod end to the head end, as is shown schematically at block 110. As discussed previously in respect to the apparatus 10 shown in FIG. 1, the apparatus to be controlled may include a conduit with a controllable regeneration valve connected between the conduits used to supply the rod end and the head end from the pump of the activation circuit, or a separate conduit between the cylinder rod end and the cylinder head end. Providing the regeneration flow path includes activating the controllable regeneration flow valve, which may be a proportional valve for controlling the flow rate through the regeneration flow path.

Method 100 further includes controlling the fluid to the head end during the load-included rod extension by controlling the flow through the regeneration flow path and directing flow from the cylinder activation circuit to the head end, as is represented by block 112 of FIG. 2. More specifically, controlling the flow to the cylinder head end, as would be understood from the present disclosure, may be accomplished by independently controlling both the regeneration valve 54 and the directional control valve 34. Moreover, for apparatus such as depicted in FIG. 1, having a proportional regeneration valve and as well as a proportional directional control valve 34, the controlling may be in respect to the desired rate of rod extension, such as by the use of a suitably programmed controller such as controller 38 activating the respective valves.

Figure 4:
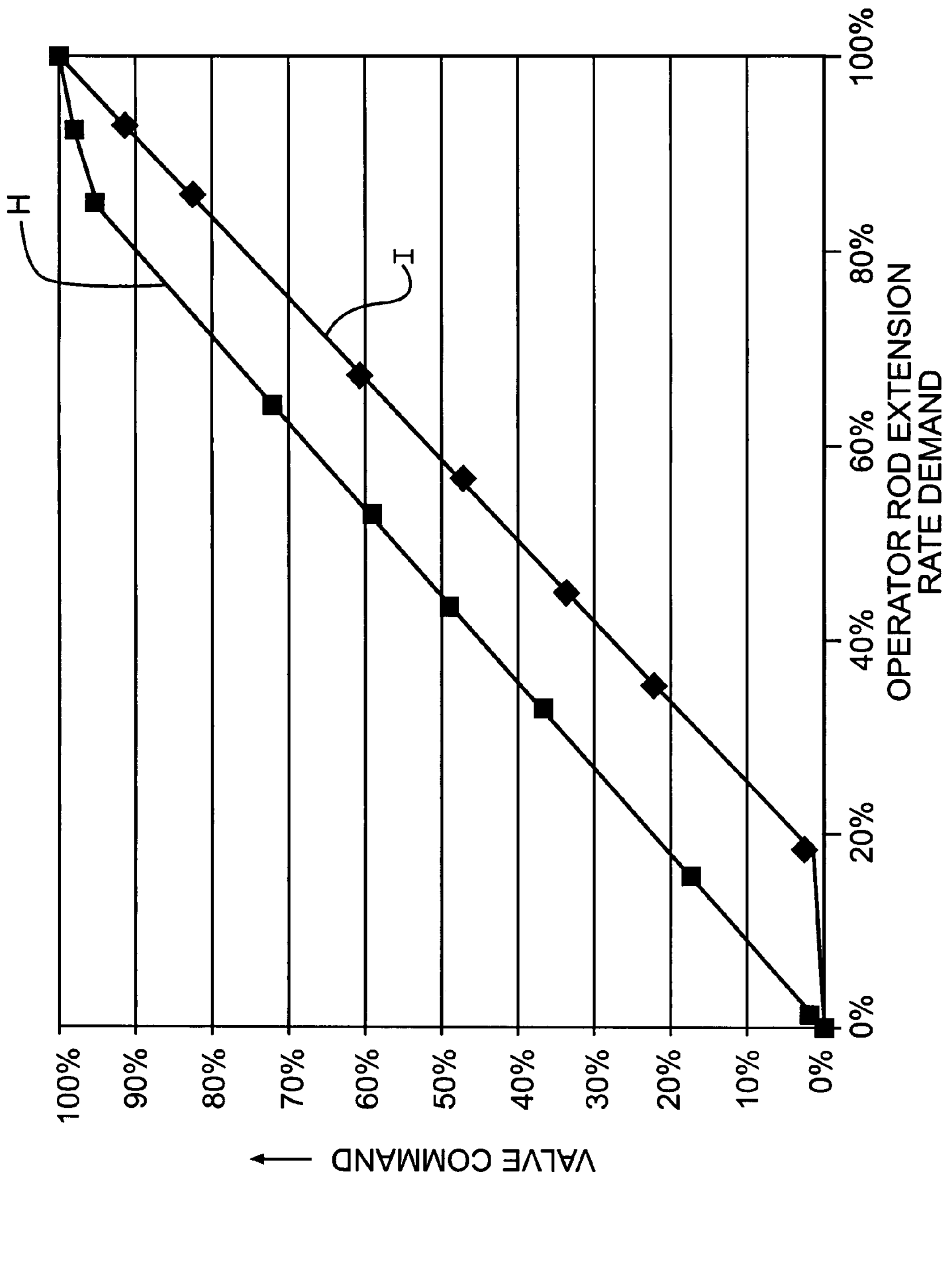
FIG. 4 is a graph showing valve command versus operator rod extension rate demand, for the regeneration valve and the directional control valve of the apparatus in FIG. 1.

For example, FIG. 4 shows a modulation (control) scheme for directional control valve 34 and regeneration valve 54, for one possible load-induced rod extending operation, using the apparatus depicted in FIG. 1. In operation, the operator's rate demand is translated by controller 38 to provide separate commands to regeneration valve 54 and directional control valve 34. For "small" operator rate demands such as less than a threshold value (e.g. less than about 15%), only regeneration valve 54 is opened an amount depicted by curve "H" in FIG. 4, while directional control valve 34 stays "closed" in respect to flow from pump 26 to head end 16. This regeneration-flow-only condition allows controlled extension of rod 20 during e.g. rod positioning, and thus smoother operation, without intercepting any pump flow from other functions.

For "medium" operator rate demands (e.g. between about 15% and about 60%), during e.g. load-lowering, regeneration valve 54 is open and directional control valve 34 is shifted to the 34*c* position, where the flow path from pump 26 to head end 16 is opened a relative amount depicted by curve "I" in FIG. 4 but where the return flow path from rod end 14 to tank 24 is closed, as discussed previously.

For "high" operator rate demands (e.g. between about 60% and about 100%), for e.g. "quick-drop" operation regeneration valve 54 is open and directional control valve 34 is shifted to the 34*d* position, where the return-to-tank flow path is opened but restricted. The opening amount of the return flow restriction is not shown in FIG. 4. This modulation scheme provides a "soft coupling" of the synchronization between directional control valve 34 and regeneration valve 54. One skilled in the art would be able to provide a suitably programmed controller to carry out the control scheme discussed above, and similar schemes.

Method 100 further includes restricting the flow of fluid displaced from the rod end to the reservoir along the return path, as shown in block 114 of FIG. 2. The flow restricting function can be accomplished using a suitable return valve which can be a proportional valve (such as the specially configured directional control valve 34 or alternative separate valve 60, both shown in FIG. 1), and which is controlled separately from the regeneration flow valve 54. As discussed previously in relation to the apparatus of FIG. 1, totally preventing flow along the return path from the displaced flow from the rod end of the cylinder during preselected conditions of rod extension has the advantage of directing essentially 100% of the displaced fluid through the regeneration flow path, thus minimizing the volume of any pressurized fluid required to be supplied from pump 26, as discussed previously.

Method 100 further includes totally restricting (i.e. shutting off) the flow from rod end 14 to reservoir 24 along the return path only for certain rod extending rates demanded by an operator, such as rates less than a predetermined rate. This method element is represented by logic block 116 in the FIG. 2 flow chart, which depicts a method element that restricts displaced rod end fluid from flowing along the return path for rod extending rates less than a predetermined rate, that is, for e.g. controlled load-lowering, but also permits restricted flow along the return path for rod extending demand rates greater than or equal to the predetermined rate, for e.g. "quick-drop". As would be understood, the control of the respective valves may be accomplished using a suitably programmed microprocessor-based controller, such as controller 38 depicted in FIG. 1. One skilled in the art would be able to provide suitable programming for such a controller given the above disclosure.

It would be apparent to those skilled in the art that various modifications and variations can be made to the disclosed apparatus and method for controlling a double-acting hydraulic cylinder during load induced rod extending movement. Other embodiments will be apparent to those skilled in the art from consideration of this specification and practice of the disclosed apparatus and method. It is intended that the specification and examples be considered as exemplary only, with a true scoping indicated by the following claims and their equivalents.

What is claimed is:

1. Apparatus for controlling a double-acting hydraulic cylinder during a load-induced rod-extending operation, the cylinder being activated by fluid supplied from a reservoir by a pump, the cylinder having a rod end, a head end, a piston connected to a rod for engaging the load, the cylinder piston being urged toward the rod end by the load during the operation, the apparatus comprising:

- a cylinder activation circuit including an activation valve for providing a flow path from the pump to the cylinder head end;
- a flow regeneration circuit fluidly connecting the cylinder rod end and the cylinder head end and configured for providing flow from the cylinder rod end to the cylinder head end during rod extension, the regeneration circuit including a regeneration flow valve controllable independently from the activation valve;
- a rod position sensor configured and positioned to generate rod position signals;
- a controller responsive to the rod position signals and operatively connected to the regeneration flow valve and the activation valve, the controller being responsive to rod-extending rate demands from an operator to control the activation valve to provide flow from the pump to the head end and to control the regeneration valve to provide flow from the rod end to the head end; and wherein the cylinder activation circuit also includes a return flow path between the cylinder rod end and the fluid reservoir, and a return valve positioned in the return flow path and configured to control flow from the cylinder rod end to the fluid reservoir, wherein both the activation valve and the return valve are controllable by the controller independently from the regeneration flow valve wherein the activation valve comprises a directional control valve configured to selectively fluidly interconnect the pump with the cylinder head end or the cylinder rod end, and wherein the return valve is configured as part of the directional control valve.

2. The apparatus as in claim 1, wherein the controller is configured to control the return valve to prevent flow from the rod end to the reservoir for load-induced rod-extending demand signals corresponding to a rod-extending rate less than a predetermined value, whereby essentially all of the flow out of the rod end is regenerated to the head end.

3. The apparatus as in claim 1, wherein the directional control valve is a four-position four-way spool-activated valve operably connected to each of the head end, rod end, pump, and fluid reservoir, and wherein the directional control valve is configured to allow flow between the cylinder rod end connection and the fluid reservoir connection for a spool position corresponding to rod-extending rate values greater than or equal to a predetermined value.

4. The apparatus as in claim 3, wherein the directional control valve is configured to provide flow from the reservoir to the cylinder head end and to prevent return flow from the cylinder rod end to the reservoir for spool positions within a predetermined distance from a spool neutral position in a direction to provide rod-extending, and to provide flow from the reservoir to the cylinder head end and to allow return flow from the cylinder rod end to the reservoir for spool positions greater than or equal to the predetermined distance in the rod-extending direction.

5. The apparatus as in claim 1, wherein the controller also is configured to cause the directional control valve to allow return flow from the rod end to the fluid reservoir in response to the rod position signals when the rod is moving at greater than or equal to a threshold velocity.

6. The apparatus as in claim 1, wherein the regeneration flow valve is a proportional valve, and wherein the controller is configured to control the regeneration flow valve relative to the rate of rod-extending demanded by the operator.

7. The apparatus as in claim 1, wherein the activation valve is a proportional valve, and wherein the controller is configured to control the activating valve relative to the rate of rod-extending demanded by the operator.

8. A load-lowering implement having a double-acting cylinder, a hydraulic fluid reservoir, and a pump, the implement further including the apparatus of claim 1.

9. A work implement for lowering a load against the force of gravity, the implement comprising:

a hydraulic cylinder, the cylinder having a rod end, a head end, and a piston connected to a rod engageable with the load, the piston moving toward the rod end during the load-lowering operation;

a reservoir of hydraulic fluid;

a pump operatively connected to the reservoir for supplying hydraulic fluid under pressure;

a rod position sensor configured and positioned to generate rod position signals;

a cylinder activation circuit including a cylinder activation valve operatively connecting the pump and the cylinder head end, for selectively directing pressurized fluid to the head end during the load-lowering operation; and a regeneration circuit including a regeneration flow valve fluidly connected to the cylinder rod end and the cylinder head end, for selectively directing fluid from the rod end to the head end during the load-lowering operation, wherein the cylinder activation circuit includes a return flow path from the rod end to the fluid reservoir, wherein the cylinder activation circuit is responsive to the rod position signals and further includes a return control valve configured to selectively control flow along the return flow path during the load-lowering operation, wherein the return control valve is controllable independently from the regeneration flow valve wherein the cylinder is a double-acting cylinder, wherein the cylinder activation valve is a spool-activated directional control valve, and wherein the return control valve is configured as part of the directional control valve.

10. The implement as in claim 9, wherein the regeneration flow valve is operable only for rod lowering rates less than a predetermined value.

11. The implement as in claim 9, further including a controller responsive to operator load-lowering rate demands and operatively connected to the return control valve, wherein the controller provides return control valve closure for lowering rates less than a predetermined value and return control valve opening for lowering rates greater than or equal to the predetermined value.

12. The implement as in claim 9, wherein both the regeneration flow valve and the cylinder activation valve are proportional valves, the implement further including a controller responsive to operator load-lowering rate demands and operatively connected to control the regeneration flow valve and the cylinder activation valve in accordance therewith.

13. The implement as in claim 9, wherein the return control valve is configured to restrict flow in the return flow path when the rod is moving at greater than or equal to a threshold velocity.

14. Method of controlling a double-acting hydraulic cylinder during load-induced rod-extending movement, the cylinder being activated by pressurized hydraulic fluid supplied from a reservoir by a pump and an activation circuit including a directional control valve for selectively directing the pressurized fluid to the cylinder head end or the rod end, the activation circuit also including a return flow path from the rod end to the reservoir for fluid displaced from the rod end during rod-extension, the method comprising:

providing a regeneration flow path from the rod end to the head end;

sensing rod positions and generating signals representative thereof;

controlling fluid flow to the head end during the load-induced rod-extension;

wherein the controlling includes independently controlling the fluid flow from the rod end through the regeneration path to the head end and independently controlling the fluid flow from the pump to the head end, wherein the controlling further includes controlling the flow of displaced fluid from the rod end to the reservoir along the return flow path in response to the generated rod position signals and independently from controlling the flow through the regeneration flow path, wherein a return flow valve is included as part of the spool-activated directional control valve, and wherein the controlling of the fluid flow from the pump to the head end and controlling the flow of displaced fluid from the rod end to the reservoir along the return flow path are both carried out concurrently by moving the spool of the directional control valve.

15. The method as in claim 14, wherein controlling the return flow includes preventing any return flow during the load-induced rod-extension operation for load-induced rod extension rates less than a predetermined value, whereby essentially all of the displaced fluid is directed to the head end through the regeneration path.

16. The method as in claim 14, wherein the regeneration flow path includes a proportional regeneration valve and the activation circuit includes a proportional directional valve; and wherein the method includes controlling the regeneration valve and the directional valve in accordance with a desired rate of load-induced rod-extension.

17. The method as in claim 14, wherein controlling the return flow of fluid from the rod end to the reservoir during load-induced rod extension includes preventing return flow for desired rates of load-induced rod extension less than a predetermined value and permitting return flow for rates equal to or greater than the predetermined value.

18. The method as in claim 14, wherein the controlling the flow from the pump to the head end during load-induced rod extension also includes preventing flow from the pump to the head end for operator rate demands less than a threshold value.

* * * * *